United States Patent
Wu et al.

(10) Patent No.: US 6,870,891 B2
(45) Date of Patent: Mar. 22, 2005

(54) LOW LATENCY FOR START OF INITIAL AUTOMATIC GAIN CONTROL FOR DATA IN DIGITAL SIGNAL PROCESSING

(75) Inventors: Quang Wu, Portland, OR (US); Gene A. Frederiksen, Hillsboro, OR (US)

(73) Assignee: Intel Corporation, Santa Clara, CA (US)

( * ) Notice: Subject to any disclaimer, the term of this patent is extended or adjusted under 35 U.S.C. 154(b) by 739 days.

(21) Appl. No.: 09/745,969

(22) Filed: Dec. 21, 2000

(65) Prior Publication Data

US 2002/0118779 A1 Aug. 29, 2002

(51) Int. Cl.⁷ .......................... H04L 27/08; H03K 9/00; H04B 1/06
(52) U.S. Cl. ...................... 375/345; 375/316; 455/234.1
(58) Field of Search ............................... 375/345, 346, 375/254, 316; 455/137, 234.1, 138; 379/388.03, 370.03; 342/92; 359/194, 341.41; 367/98; 330/129

(56) References Cited

U.S. PATENT DOCUMENTS

| | | | | |
|---|---|---|---|---|
| 4,075,573 A | * | 2/1978 | Kennedy et al. | ............. 330/129 |
| 5,036,527 A | * | 7/1991 | Halim et al. | ................. 375/345 |
| 5,134,631 A | * | 7/1992 | Kingston et al. | ........... 375/345 |
| 5,463,662 A | * | 10/1995 | Sutterlin et al. | ............. 375/351 |
| 6,038,435 A | * | 3/2000 | Zhang | ...................... 455/234.1 |
| 6,094,481 A | * | 7/2000 | Deville et al. | ......... 379/388.03 |
| 6,148,046 A | * | 11/2000 | Hussein et al. | ............. 375/345 |
| 6,418,303 B1 | * | 7/2002 | Blackburn et al. | ....... 455/234.2 |

* cited by examiner

*Primary Examiner*—Chieh M. Fan
*Assistant Examiner*—Jason M. Perilla
(74) *Attorney, Agent, or Firm*—Blakely, Sokoloff, Taylor & Zafman LLP

(57) ABSTRACT

An apparatus and method for controlling the AGC in a receiver is described. Samples of the input signal are compared to the upper and lower threshold values which are defined by the dynamic range of the A-to-D converter. These samples are recorded and used in determining whether to count-up or count-down in counters prior to the time the signal is detected. These counts provide, in effect, a history of what has occurred prior to signal detection and are used in computing an AGC gain. The gain can be computed more quickly since there is zero latency in starting the calculation for correcting the AGC.

11 Claims, 4 Drawing Sheets

LOW LATENCY FOR START OF INITIAL AUTOMATIC GAIN CONTROL FOR DATA IN DIGITAL SIGNAL PROCESSING

BACKGROUND OF THE INVENTION

1. Field of the Invention
2. Prior Art

Typically, most high speed digital receivers used in networking consist of an analog front end (AFE) and a digital base-band processor (DBP). Once such processor will be discussed subsequently in conjunction with FIG. 1. The AFE amplifies the incoming analog signal at a gain setting which is generally variable. Ideally, the gain is set so that the entire dynamic range of an analog-to-digital converter is used since this enables the best signal detection. After signal or carrier detection, a predetermined number of samples are needed to adjust the gain. It is desirable to have this adjustment done as soon as possible during the preamble of a data packet because this provides for a more stable receiver.

As will be seen, the present invention reduces the time required for gain control to occur and in effect, provides zero latency for the initiation of the computation used for gain control.

DETAILED DESCRIPTION OF THE INVENTION

A zero latency circuit for starting a gain control calculations for a digital signal processor (DSP) is described. In the following description, specific details such as specific components are described in order to provide a thorough understanding of the present invention. It will be apparent to one skilled in the art that the present invention may be practiced without these details. In other instances, well-known circuits have not been described in detail in order not to unnecessarily obscure the present invention.

Figure 1:
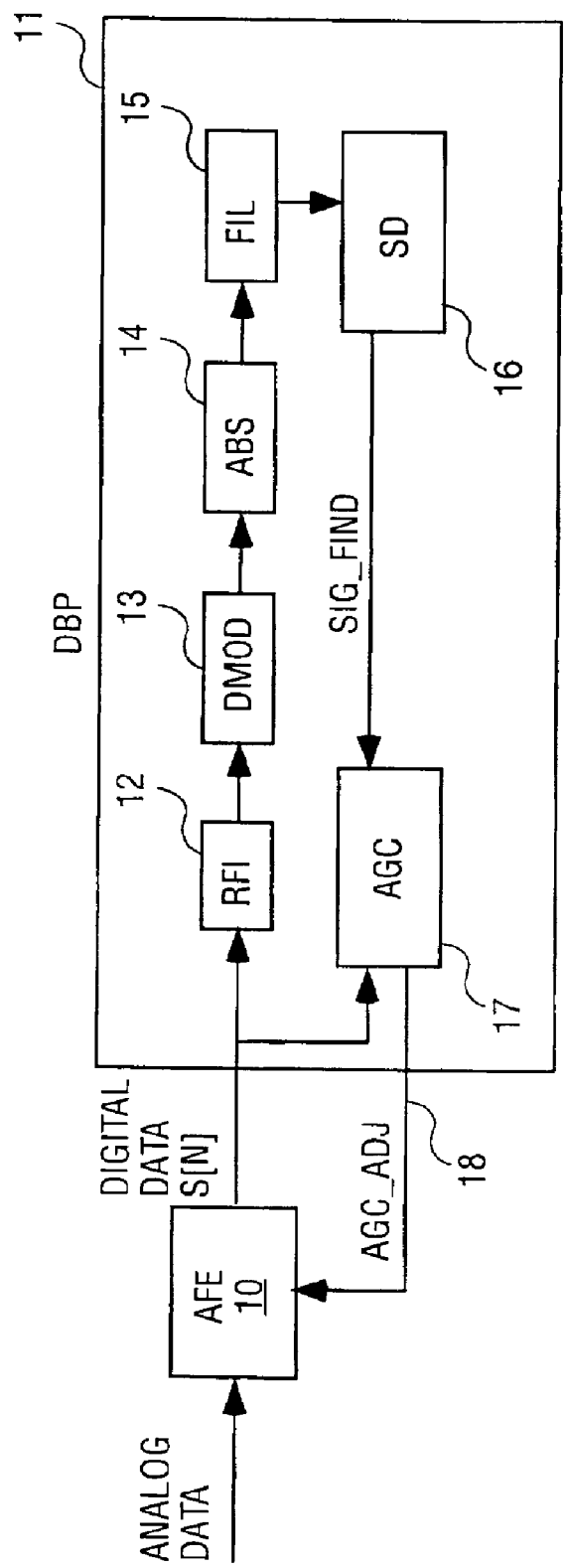
FIG. 1 is a block diagram illustrating a prior art digital receiver such as used in networks.

Referring first to FIG. 1, a typical prior digital receiver such as used for digital signal processing is illustrated. The receiver includes an analog front end (AFE) 10 having an analog amplifier with automatic gain control (AGC), the gain of which is controllable by a signal on line 18, and an analog-to-digital converter which receives the amplified signal. Samples (Sn) of the input analog signal are obtained within the AFE 10 and coupled to the digital base-band processor (DBP) 11. Generally, for all linear modulations such as quadrature amplitude modulation (QAM), the signal gain level is determined in the DBP and if a gain adjustment is necessary a new gain value is sent to the AFE on line 18.

The AGC plays an important role in both wired and wireless digital transceiver networks. The use of the AGC significantly increases the receiver's dynamic range and therefore the performance of the receiver. The longer a receiver can train on a preamble (the header portion of the data frame which is used for channel chaining, frequency or time synchronization) at the correct gain setting, the better the performance of the receiver.

To verify that a signal is at the correct gain setting, the amplitude of a signal is measured after the signal is detected in the DBP 11. Before this can occur, however, the signal is processed with for instance, the radio frequency interference suppressor (RFI) 12 and signal demodulator (Dmod) 13. Then the absolute value and truncation of the signal occurs within the ABS 14. Filtering typically now is used, such as with low pass filtering through the filter (FIL) 15. The signal detector (SD) 16 determines when a signal is above a signal detect threshold, thereby verifying that a signal is present. Once a signal has been detected (SIG_FIND) goes high, and then the automatic gain control (AGC) logic 17 compares the signal amplitude to a predetermined threshold for a chosen constant number of cycles to determine if the gain is correct. If a gain is not correct, the AGC logic 17 sets a new gain on line 18 in the AFE 10.

The initial start to determine if the AGC level is correct is delayed from the time a signal is received until the signal is processed by the AFE 10 and through the SD 16 of the DBP 11. Then, additional time is required for the AGC computation. Ideally, the AGC calculation should start with zero latency to maximize the useful training period during the preamble, as will be described for the present invention.

Figure 3:
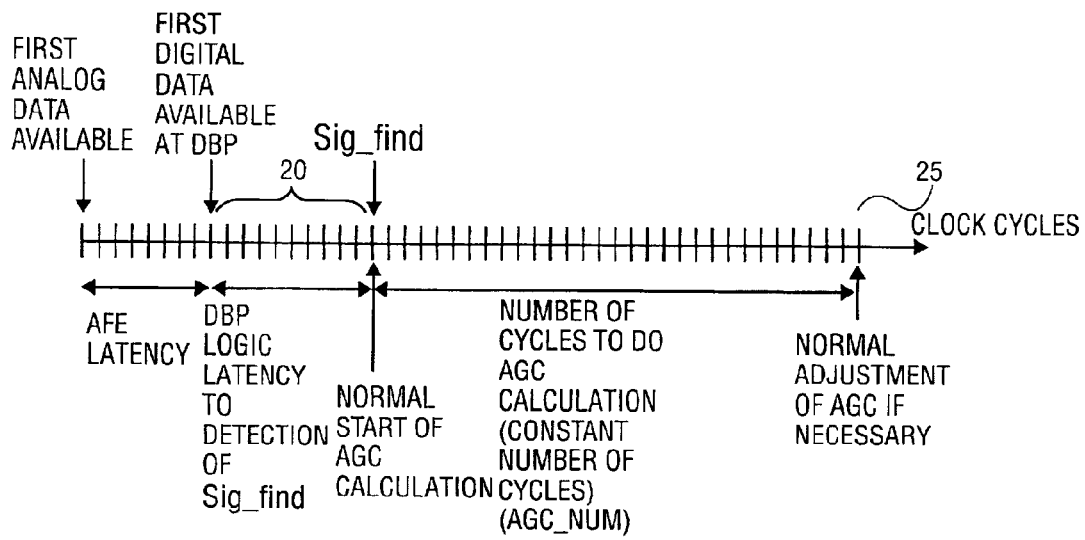
FIG. 3 is a timing diagram used in conjunction with FIG. 1.

As shown in FIG. 3, the timing diagram for the circuit of FIG. 1 begins with an AFE latency. This is the period between when the first analog digital signal is received and converted to a digital sample. Then after the DSP logic latency period 20, the signal is detected and (SIG_FIND) occurs. Once SIG_FIND occurs, the AGC computation begins. A relatively large number of sample periods is required for the calculation before AGC_NUM occurs. Now, at time 25 the AGC can be corrected, if necessary. The sooner that the AGC can be brought to, or determined to be at a correct level, the better the system performance becomes. As can be seen from FIG. 3, there is a substantial latency before the AGC calculation begins, specifically the AFE latency and the period 20.

Figure 2:
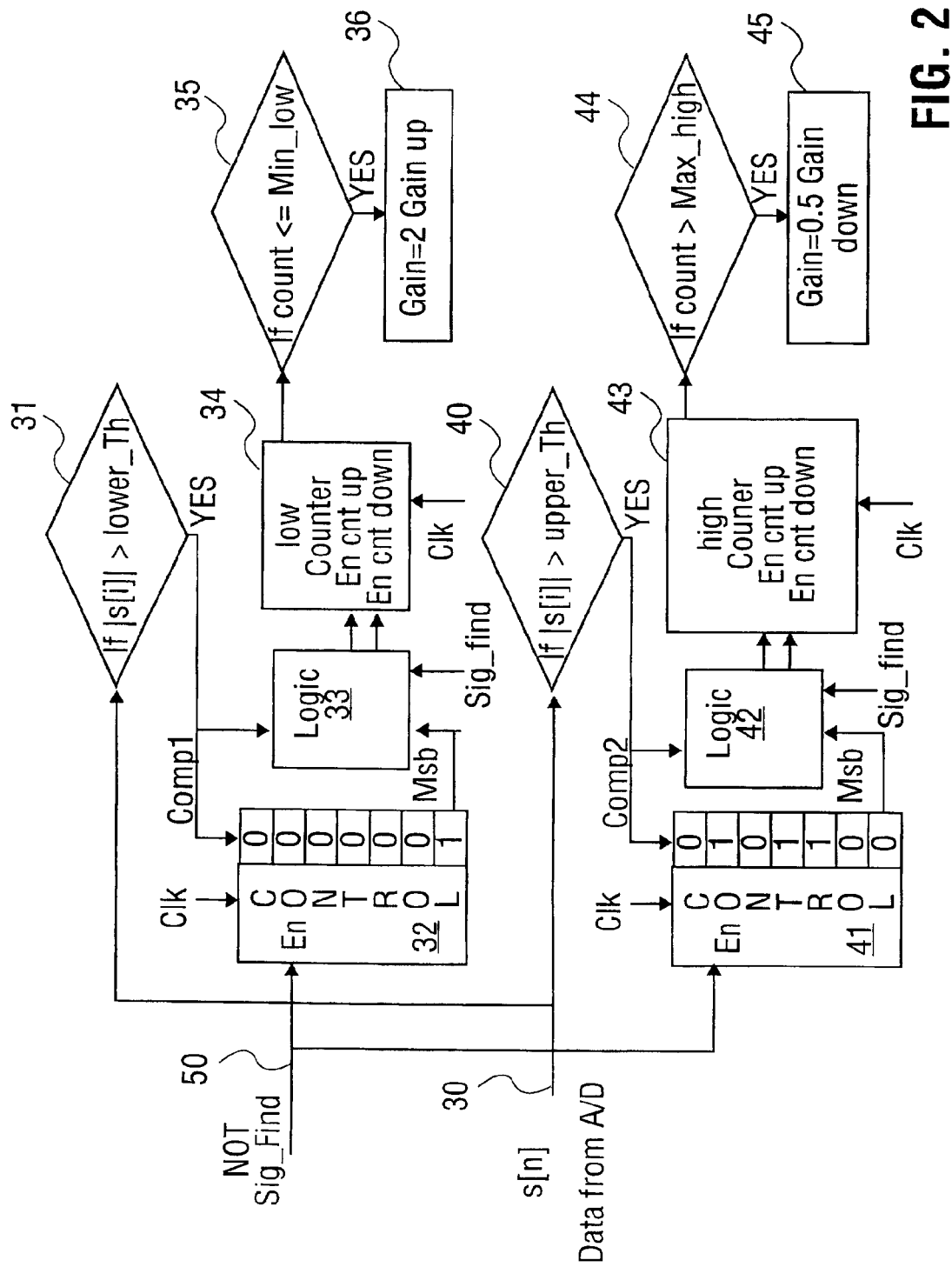
FIG. 2 is a circuit diagram of an embodiment of the present invention.

Turning now to FIG. 2, the circuit provides gain control signals which control gain such as the signal on line 18. The circuit represented by FIG. 2 receives the complement of the SIG_FIND signal and samples S(n) from the analog-to-digital converter of the AFE. Additionally, the circuit receives a clocking signal which corresponds to the sample clock used within the AFE. The input signal samples which are taken at the output of the analog-to-digital converter and thus have been amplified by the gain control amplifier, are coupled to the circuit of FIG. 2 on line 30. These samples are coupled to a first comparator 31 and a second comparator 40. Within comparator 31, each sample is compared to a voltage threshold level which represents a minimum signal level of the dynamic range of the analog-to-digital converter. If the signal is greater than this lower voltage threshold, then the condition of the comparator 31 is met and a signal is coupled to both the shift register 32 and the logic circuit 33. Similarly, the comparator 40 compares the signal on line 30 with an upper digital threshold limit, this limit corresponding to the upper digital voltage range of the analog-to-digital converter. If the signal is greater than the upper threshold, then a signal is applied to the shift register 41 and to the logic circuit 42.

As will be seen the shift registers 32 and 41 record a history of whether the incoming signals are greater than the lower and upper thresholds. In effect, they provide a history in a trailing window of the past relative signal amplitudes. These, as will be seen, enable zero latency in starting the calculation of a AGC signal. For the embodiment of FIG. 2, this history is stored as one bit data signals in the shift registers 32 and 41. Other memory means such as a random-access memory (RAM) can be used to store this information.

On each sample clock pulse, the shift registers 32 and 41 are incremented such that the data from the comparators is shifted from stage-to-stage within the shift registers. A "1" or a "0" from the comparators 31 or 40 is consequently shifted to the most significant bit position in the shift registers. Both shift registers receive the complement of the SIG_FIND signal on line 50. As long as the complement of SIG_FIND is high, the shift registers shift. Once an input signal is detected, SIG_FIND will go high and shifting ceases and the most significant bit from the register is no longer used within the circuit of FIG. 2 for the AGC calculation as indicated by the "X" in the Truth Table below.

TRUTH TABLE

| SIG_FIND | For Both Comparators | Shift Reg Msb | En cnt up Output | En cnt down Output |
|---|---|---|---|---|
| 0 | 0 | 0 | 0 | 0 |
| 0 | 0 | 1 | 0 | 1 |
| 0 | 1 | 0 | 1 | 0 |
| 0 | 1 | 1 | 0 | 0 |
| 1 | 0 | X | 0 | 0 |
| 1 | 1 | X | 0 | 0 |
| 1 | 1 | X | 1 | 0 |
| 1 | 1 | X | 1 | 0 |

The logic circuit 33 receives the output of the comparator 31, the most significant bit from the register 32 and the SIG_FIND signal. Similarly, the logic circuit 42 receives the most significant bit from the register 41, the output of the comparator 40 and the SIG_FIND signal. The above table shows whether the output of the logic circuit enables a count-up signal, a count-down signal or no count. The first column in the table is the state of the SIG_FIND signal, the second column is the output of the comparator 31 (COMP1) or the comparator 40 (COMP2), the third column indicates the state of the most significant bit in the shift registers 32 and 41. The output of the logic circuits are shown in the last two columns as either a count-up signal, a count-down signal or no signal.

A first counter (low counter 34) receives the count-up and count-down signals from the logic circuit 33 as well as a clock signal. Similarly, a high counter 43 receives count-up and count-down signals from the logic circuit 42 as well as the clocking signal.

The count within the counter 34 is compared to a count stored within the third comparator 35. In a similar manner, the count within a counter 43 is compared to a predetermined count stored within the comparator 44. If the count within the counter 34 is less than or equal to the count stored within the counter 35 (MIN_LOW) the conditions of the comparator 35 are met and a signal is applied to the gain control circuit 36. If the count within the counter 43 is greater than the count stored in the counter 44 (MAX_HIGH) the conditions of the fourth comparator 44 are met and a signal is sent to the gain control 45. The gain control 36 and the gain control 35 are integral parts of the gain control circuit. Block 36 is used to illustrate a doubling of the gain, whereas block 45 illustrates a halving of the gain. These blocks are shown separately in FIG. 2 but are typically an integral part of the AGC circuit.

Initially for the circuit of FIG. 2, the shift registers contain all zero's and the counters 34 and 43 are set to zero. The number of stages in the shift registers 32 and 41 are sufficient to hold data representative of the relative amplitude of the samples that occur between the receipt of a first digital data signal and SIG_FIND that is, when the signal is first detected. This is shown in FIG. 3 for instance, as the DBP logic latency. The counters 34 and 43 may have 3 or 4 bits each in a typical application.

In operation, the comparator 31 determines when a sample is larger than the stored threshold value, and when this occurs a signal (binary 1) is sent to the shift register 32 and to the logic circuit 33. As can be seen from the Truth Table above, since the conditions of the comparator are met and the most significant bit from the register is still a zero, counter 31 will count up by one count. On the other hand, if the conditions of comparator 31 are not met, a zero is sent to the shift register 32. The same operation is done by the comparator 40 if the sample is greater than the upper voltage threshold value.

As mentioned, the shift register will have all zero's initially. After the receiver is enabled, and after the number of clocks issued equals the total latency of the AFE and the DBF (to SIG_FIND), the shift registers will be full and hold a record of when the threshold counters were enabled to count up. If SIG_FIND has not been asserted at this point, the process continues comparing the most significant bit of the shift registers, the comparator outputs and the SIG_FIND signal to control the threshold counters as shown in the Truth Table above. If the most significant bit of the shift register 31 is 1, and the output of the comparator 31 is 0, the counter 31 will have a count-down signal. This, in effect, means that the data for that clock position in the shift register was not data from an actual signal because SIG_FIND did not become valid while that bit was in the most significant position in the shift register. This process continues until SIG_FIND goes active. Similarly, this process continues for the counter 43 when the sample is greater than the upper threshold of that comparator.

Once the control signal SIG_FIND is asserted, the shift registers and the most significant bit from the shift registers has no affect on the output of the logic circuits 33 and 42. Only the output of the comparators are used by the logic circuits 33 and 44 to enable the count up in the counters. When SIG_FIND goes active, the counters have the count representing the number of times that the samples were above the lower and upper voltage thresholds for the number of data samples that is equal to the total number of cycles of DBP logic latency as discussed above. Note that if a number of clock cycles for DBP logic latency, is equal to the total number of cycles needed to do the AGC calculation (AGC_NUM), then the first AGC gain adjustment may be done at the same cycle time as the signal is detected (SIG_FIND).

Figure 4:
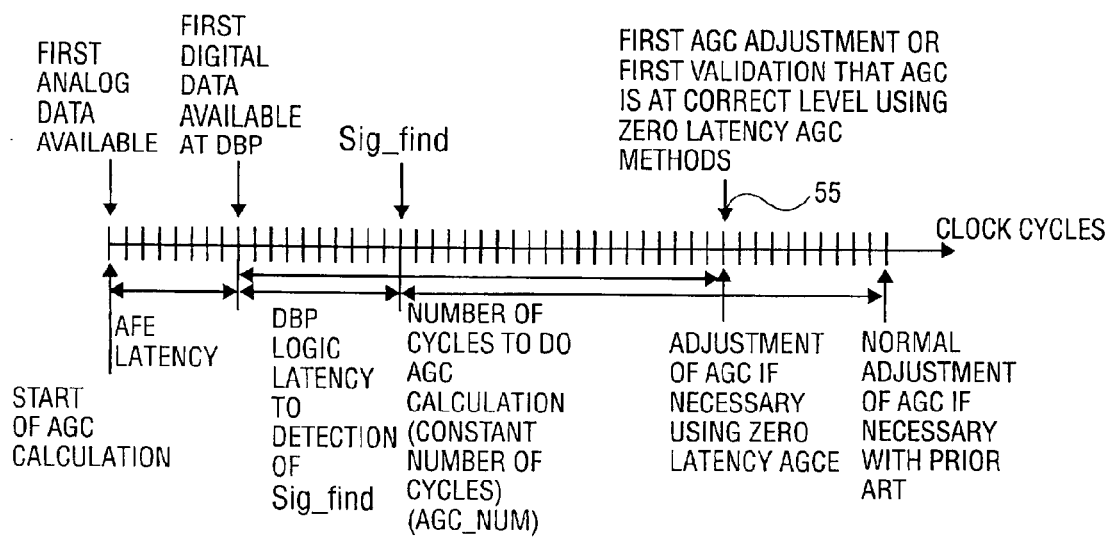
FIG. 4 is a timing diagram used in conjunction with FIG. 2.

As shown in FIG. 4, again receipt of the first analog data is shown along with the AFE latency and the DBP latency all occurring before SIG_FIND. As can be seen, the number of cycles to do the AGC calculation includes the AFE and DBP latency periods since the counters have been operating as described above during this latency period. Thus, the first sample that occurs after SIG_FIND is used along with the current count in the counters to enable the AGC calculation to be continued. As shown in FIG. 4, the first AGC adjustment occurs at time 55 which is substantially sooner than the time 25 of FIG. 3, To finish the AGC adjustment once SIG_FIND occurs, the process is continued until AGC_NUM number of cycles have been used to calculate the signal amplitude (gain). If the count value in the counter 34 is smaller or equal to the stored constant MIN_LOW in the comparator 35, then the AGC sends out a signal (AGC_ADJ) to the AFE to increase the gain by a set number of dBs, for instance 3 dB. The same operation applies to the counter 43 except the gain is reduced by a set number of dBs when the conditions are met.

The MIN_LOW value stored within register 35 can be empirically determined based on overall receiver performance. The same is true for MAX_HIGH in the comparator 44. These values initially may be set midway between the maximum counts of the counters 34 and 43.

Figure 5:
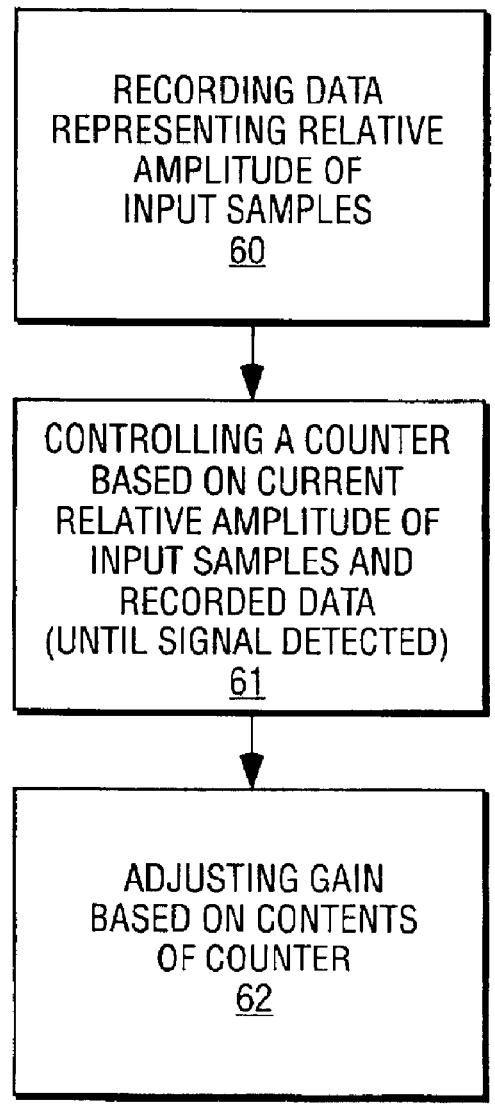
FIG. 5 illustrates steps used in the present invention.

The steps used by the circuit of FIG. 2 are shown from the standpoint of overall circuit operation in FIG. 5. As shown within step 60 the data is recorded representing the relative amplitude of the input samples. This is done as discussed by placing binary 1's or 0's into the shift registers 32 and 41.

As shown by step 61, a counter is controlled based on the current relative amplitude of the input sample and the recorded data. The recorded data is only used up until the time that SIG_FIND occurs. The counting up and counting down logic for the counters is shown in the Truth Table set forth above.

Finally, as shown by step 62 the gain is adjusted based on the contents of the counter when the AGC calculation is completed.

Thus, a circuit has been described which has zero latency for the start of an initial AGC calculation in a digital signal processor.

What is claimed is:

1. A digital signal processor comprising:

an analog front end including an analog-to-digital converter for receiving an input signal;

a digital base-band processor having a latency period for detecting a signal, coupled to the analog front end;

a shift register for tracking data representing relative amplitudes of samples of the input signal for a period at least equal to the latency period;

a gain control counter, coupled to the shift register, controlled by a relative amplitude of a current sample of the input signal and an output from the shift register representing a relative amplitude of one of the samples taken at an earlier time, the control ceasing once the digital base-band processor detects a signal of a predetermined threshold from the analog front end; and a gain control circuit coupled to the gain control counter for controlling a gain of the input signal.

2. The digital signal processor of claim 1 wherein the gain control circuit includes a comparator for comparing a count in the gain control counter with a predetermined count and based upon the results of the comparison, adjusts the gain of the input signal.

3. A digital signal processor comprising:

an analog front end including an analog-to-digital converter for receiving an input signal;

a digital base-band processor having a latency period for detecting a signal, coupled to the analog front end;

a first shift register and a second shift register for tracking data representing relative amplitudes of samples of the input signal;

a gain control counter controlled by a relative amplitude of a current sample of the input signal and an output from the shift registers representing a relative amplitude of one of the samples taken earlier in time, coupled to the shift registers; and a gain control circuit coupled to the gain control counter for controlling a gain of the input signal.

4. The digital signal processor of claim 3 wherein the first shift register is coupled to a first comparator which compares samples of the input signal with a low threshold level.

5. The digital signal processor of claim 4 wherein the second shift register is coupled to a second comparator which compares samples of the sampled input signal with a high threshold level.

6. The digital signal processor of claim 5 wherein the first and second shift registers each have a number of stages approximately equal to a number of samples occurring during the latency period.

7. The digital signal processor defined by claim 6 wherein the gain control counter comprises a first gain control counter and a second gain control counter, the first gain control counter being controlled by the first comparator and the first shift register and the second gain control counter being controlled by the second comparator and the second shift register.

8. The digital signal processor defined by claim 7 including a first logic circuit coupled to receive a most significant bit from the first shift register and an output of the first comparator for providing a count up signal and a countdown signal to the first gain control counter.

9. The digital signal processor of claim 8 including a second logic circuit coupled to receive a most significant bit from the second shift register and an output of the second comparator for providing a count up signal and a count down signal to the second gain control counter.

10. The digital signal processor of claim 7 including a third comparator for comparing a current count in the first gain control counter with a first predetermined count and for providing an output for increasing the gain if the current count is less than the first predetermined count.

11. The digital signal processor of claim 10 including a fourth comparator for comparing the current count in the second gain control counter with a second predetermined count and for decreasing the gain in the current count is greater than the second predetermined count.

* * * * *